March 15, 1966   R. F. BRADLEY   3,240,434
IRRIGATION NOZZLE
Filed Jan. 13, 1964
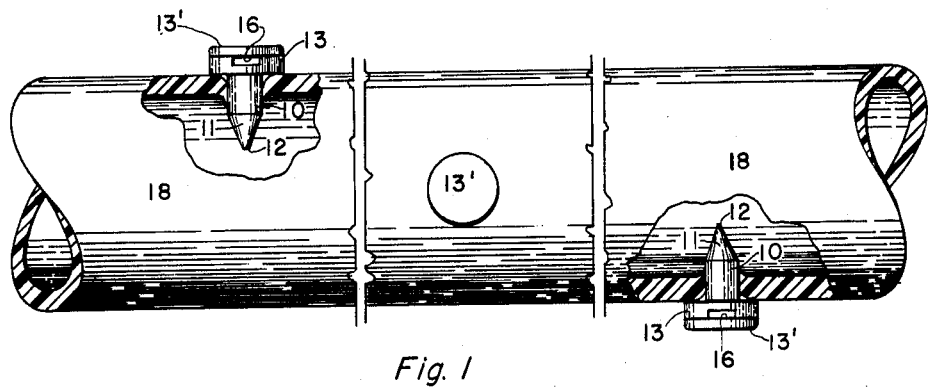
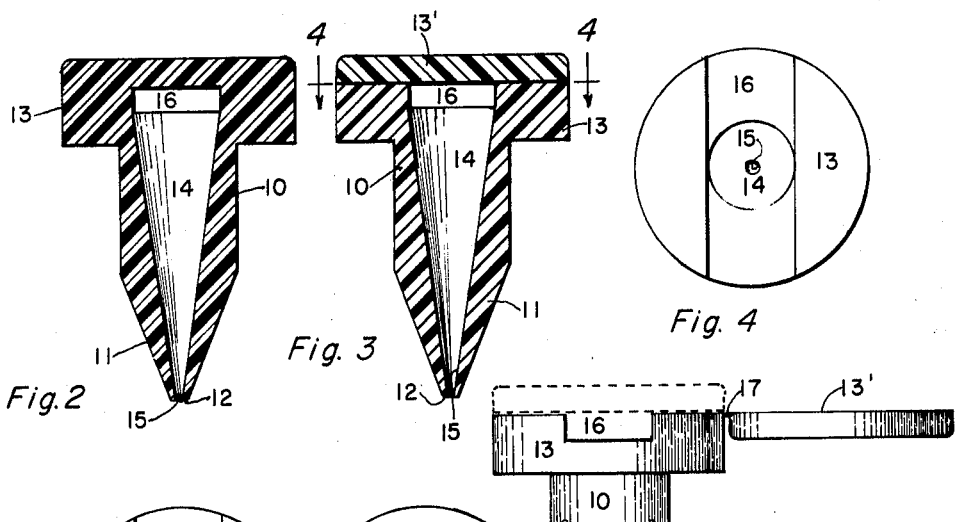
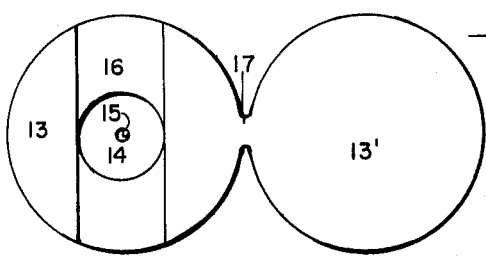
INVENTOR.
Ralph F. Bradley
BY
ATTORNEY

United States Patent Office 3,240,434
Patented Mar. 15, 1966

3,240,434
IRRIGATION NOZZLE
Ralph F. Bradley, 1646 S. Depew St., Denver 26, Colo.
Filed Jan. 13, 1964, Ser. No. 337,336
4 Claims. (Cl. 239—547)

This invention relates to the practice and techniques of irrigation as primarily directed to controlled supply of water to soils, and more particularly, although not exclusively, to sub-surface supply and distribution of irrigating water circulated, as is common, through fixed systems of buried flow lines, and has as an object to provide a novel and improved nozzle expedient of association in multiple with the flow lines of irrigating systems for diversion and efficient outflow delivery of water as desired therefrom.

A further object of the invention is to provide a novel and improved irrigation nozzle that is feasible of operative association in any preferred number and arrangement with conventional flow lines constituted from diverse materials without recourse to special fittings or tools and with marked conservation of time and labor.

A further object of the invention is to provide a novel and improved irrigation nozzle that is self-retentive in an unbonded application to use association with a flow line.

A further object of the invention is to provide a novel and improved irrigation nozzle that is inherently immune to clogging and obstructing influences attending the conditions of its use.

A further object of the invention is to provide a novel and improved irrigation nozzle effective to distribute outflow for permeation of and absorption by the contiguous soil with no significant disturbance thereof.

A further object of the invention is to provide a novel and improved irrigation nozzle that is peculiarly suited for operative coaction with flow lines of synthetic resin, or equivalent, materials popularly termed "plastics."

A further object of the invention is to provide a novel and improved irrigation nozzle that is simple and economical of production in a diversity of specific forms and any desired range of sizes and individual capacities, that is rugged and durable throughout a useful life equal at least to that of the associated flow line, that is amenable to relocation, salvage, and reuse, and that is positive and efficient in attainment of the ends for which designed.

With the foregoing and other objects in view, my invention consists in the construction, arrangement, and operative combination of elements as hereinafter set forth, pointed out in the appended claims, and illustrated by the accompanying drawing, in which FIGURE 1 is a side elevational view of an indeterminate length of a conventional plastic flow line as conditioned in operative association with a plurality of nozzles exemplary of the invention to distribute flow for irrigation purposes, portions of the line separating adjacent nozzles being broken away to conserve space.

FIGURE 2 is a sectional view, on a relatively-enlarged scale, taken axially of an integral form and construction of the improved nozzle.

FIGURE 3 is a sectional view similar to FIGURE 2 taken axially of a like form and alternative construction of the nozzle.

FIGURE 4 is an end view of one of the nozzle components represented by FIGURE 3 as manifest at the plane indicated by the line 4—4 applied to said latter view.

FIGURE 5 is an end view similar to FIGURE 4 of a structural modification of the nozzle feasible of production as shown in an arrangement facile of subsequent completion.

FIGURE 6 is a partial side elevational view of the arrangement according to FIGURE 5, a portion of the stem component of the nozzle being omitted to conserve space and a completed correlation of the illustrated elements being indicated by broken lines.

Soil irrigation at, above, or below the ground surface accomplished by diversion of pressurized flow from a supply line through multiple outlets spaced therealong is an approved ancient practice amenable of realization in many ways and by diverse structural arrangements. Certain considerations common to flow line irrigating systems are facility and economy of installation, expedient variability in the number and disposition of the outlets, dispersion and distribution of outflow delivery, avoidance of outlet clogging and obstruction, and functionally-reliable durability of the system and its components, each and all of which are advantageously satisfied by the novel concept and construction of the nozzle hereinafter described. A further consideration of recent significance in the practical organization of flow line irrigating systems is the availability and extensive use of plastic lines for the confinement and direction of pressurized flows which, by virtue of their inherent properties, conduce to installation economy, flexibility, and durability of systems therefrom comprised, and the ready adaptability of the improved nozzle to use with and as a flow outlet from such lines features the merit of the improvement.

However contrived in any particularity suited for its production, the improved nozzle conditioned for practical and intended use is a tack-like unit of non-rigid, stiffly-pliant material, such as the plastic utilized for the production of flow lines, formed in any feasible manner to provide a cylindrical stem 10 conically tapered at one end, as at 11, to a small blunt point 12 and a radially-enlarged, concentric head 13 at the other end of the stem. A conical passage 14 coaxially traverses the stem 10 and its tapered end 11 from intersection at its lesser end with the blunt point 12 in a small orifice 15 to open at its greater end within the head 13 in registration and flow communication with a correspondingly-wide, shallow channel 16 diametric of the head that is closed against outlet axially of the head, whereby flow input to the passage 14 through the orifice 15 is directed to delivery with reduced pressure and velocity radially of the head from the opposed outlets of the channel 16.

As represented by certain views of the drawing, the unit characterized as above set forth is amenable to diverse specific production. When, as represented by FIGURE 2, integral production of the unit is feasible the head 13 is formed to an axial dimension, or thickness, appropriate to accommodate the channel under an imperforate cover provided by the exposed, circular, outer end of the head, alternative whereto, as exemplified by FIGURES 3 and 4, the stem, tapered end, head, passage and channel elements of the unit may be integrally comprised with a head thickness adjusted to expose the diametric open run of the channel 16 for subsequent coverage by an imperforate, circular cap 13′ sized for peripheral registration with the head 13 and thereto permanently affixed in any expedient manner, as by an adhesive bond, or the equivalent. Manifestly suited for production by conventional molding techniques, the two-component organization of the unit typified by FIGURES 3 and 4 may be arranged as represented by FIGURES 5 and 6 accommodate simultaneous forming of the separate components in a conjoint association useful to facilitate their ultimate consolidation, since known skill of the art suffices to effect in the operation of molding a tangent juxtaposition of the cap 13′ to the unit head 13 with a thin web interconnection 17 therebetween, whereby to hinge the cap to the head for articulation into covering registration with and attachment to the head upon completion of their so-coupled production.

Practical use and operation of the improved nozzle should be reasonably apparent from the foregoing. It being desired to qualify a length of flow line for irrigation use, individual nozzle units of preferred size and outflow capacity having an axial length for the cylindrical stem 10 exceeding the thickness of the flow line wall are entered at their tapered ends 11 radially of and through the flow line wall in a number and spacing angularly about and longitudinally along the flow line appropriate to provide the intended irrigating outflow therefrom and are then pressed under axially-applied force to a seating of the head 13 against the exterior surface of the flow line attended by intrusion of the blunt point 12 and tapered end 11 well within the flow channel of the line and coaction of the cylindrical stem 10 with the material of the line wall. Where, as represented by Figure 1, the flow line designated 18 is of plastic material, insertion of the nozzles may be effected with but a small preliminary, or initial, penetration of the wall suited to receive the blunt point 12, since such material will yield to the pressure of nozzle application to accommodate and compressively embrace the stem 10 with a frictional grip fully adequate to retain the nozzle against displacement from its inserted position. Adaptation of the nozzles to use with metal, or other, rigid flow lines requires only the provision of holes slightly smaller than the stem 10 through the line wall at the locations thereon desired for the nozzles and pressure-seating of a nozzle in and through each of said holes, as above described, since the material from which the nozzle is comprised will yield to permit insertion of the stem through the relatively-smaller and inexpansible hole and sustain a consequent compression promotive of frictional grip to the surrounding wall material which effectively holds the nozzle against inadvertent displacement.

Positioned for use as shown and described, each of the nozzles will divert from the flow through the line that portion of the line flow that may pass through the nozzle orifice 15 and will deliver the same through the ends of the channel 16 to the contiguous area exterior to the line as a continuous dispersion of low velocity due to the form and size of the passage 14 and channel 16 relative to the input orifice 15. The location within the flow line and the small size of the intake orifice 15 preclude clogging or obstruction thereof by contaminants entrained with the flow and the imperforate cap covering the laterally-directed outlets of the channel 16 insures with practical competence against intrusion of clogging or obstructing influences from the environment surrounding the line, in addition whereto the outwardly-divergent form of the passage 14 and the associated flow clearance of the channel 16 function to wash and remove from the nozzle any entrainments passing the orifice 15.

Since changes, variations, and modifications in the form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. A discharge nozzle intrusively applicable with a press fit to frictionally self-retained coaction with selected points of a fluid flow line, comprising a unit of firm, stiffly-pliant material formed with a cylindrical stem exceeding in length the wall thickness of the associated line, said stem having a radially-enlarged head at one end and a penetrating point conically tapered to a small blunt area at its other end, a frusto-conical fluid flow passage coaxially traversing said stem from communication at its lesser end through the blunt end area of said penetrating point to closure of its greater end interiorly of said head, and a laterally-confined channel opening diametrically of said head through opposite sides thereof in registration and flow communication with the greater end of the frusto-conical passage.

2. A discharge nozzle intrusively applicable with a press fit to frictionally self-retained coaction with selected points of a fluid flow line, comprising a unit of firm, stiffly-pliant material formed with a cylindrical stem exceeding in length the wall thickness of the associated line, said stem having a radially-enlarged head at one end and a penetrating point tapered to a small blunt area at its other end, a frusto-conical fluid flow passage coaxially traversing said stem from communication at its lesser end through the blunt end area of said penetrating point to open at its greater end through said head, a channel opening diametrically and axially of said head in registration and flow communication with the greater end of the frusto-conical passage, and a cap affixed in coextensive, overlying association with said head as a closure over said channel and conjoint end of the passage effective to direct fluid output from the unit to delivery at the ends of said channel opening laterally of the head.

3. The organization according to claim 2, wherein said cap is formed in coplanar, tangential juxtaposition to said head with integral, hinged attachment thereto manipulable to close the cap into registration over and against the head.

4. In a discharge nozzle intrusive with a press fit to frictionally self-retained coaction with selected points of a fluid flow line comprised from firm, stiffly-pliant material as a unit having a cylindrical stem conjoining a radially-enlarged head and a tapered penetrating point, a frusto-conical flow passage traversing said stem from communication at its lesser end through the point to open at its greater end through the head, and a channel diametrically and axially open across said head in conjoint registration with the greater end of said passage, means for restricting output from the unit to delivery laterally of the head, said means comprising a cap coextensively registrable with said head integrally hinged in coplanar, tangential juxtaposition thereto for manipulation to affixed coaction with the head as a closure over said channel and conjoint end of the passage.

References Cited by the Examiner
UNITED STATES PATENTS

| | | | |
|---|---|---|---|
| 1,204,309 | 11/1916 | Peterson | 239—550 X |
| 1,762,313 | 6/1930 | Snow | 239—550 X |
| 2,563,300 | 8/1951 | Aker | 239—547 |
| 2,650,132 | 8/1953 | Reinecke | 239—542 |
| 2,716,574 | 8/1955 | Chase | 239—547 |

EVERETT W. KIRBY, *Primary Examiner.*